United States Patent [19]

Fujiwara

[11] 4,418,241

[45] Nov. 29, 1983

[54] INSULATED COIL

[75] Inventor: Kenzou Fujiwara, Kobe, Japan

[73] Assignee: Mitsubishi Denki Kabushiki Kaisha, Tokyo, Japan

[21] Appl. No.: 337,387

[22] Filed: Jan. 6, 1982

[30] Foreign Application Priority Data

Feb. 25, 1981 [JP] Japan .................................. 56-27236

[51] Int. Cl.³ ........................ H01B 7/02; H01H 85/02; B32B 5/16; B32B 7/00
[52] U.S. Cl. .............................. 174/121 SR; 310/208; 428/251; 428/252; 428/267; 428/268; 428/324; 428/363
[58] Field of Search ............... 428/324, 363, 267, 268, 428/251, 252, 377; 310/208; 174/121 SR

[56] References Cited

U.S. PATENT DOCUMENTS

| | | | |
|---|---|---|---|
| 3,775,628 | 11/1973 | Andersson et al. | 428/324 |
| 4,033,805 | 7/1977 | Mitsui et al. | 428/324 |
| 4,273,825 | 6/1981 | Nishiyama et al. | 428/324 |
| 4,286,010 | 8/1981 | Staley et al. | 428/251 |
| 4,335,367 | 6/1982 | Mitsui et al. | 428/324 |

FOREIGN PATENT DOCUMENTS 54-120960  9/1979  Japan .
55-65026  5/1980  Japan .

Primary Examiner—William R. Dixon, Jr.
Attorney, Agent, or Firm—Oblon, Fisher, Spivak, McClelland & Maier

[57] ABSTRACT

An insulated coil formed by a method, comprising: (a) heat bonding an integrated mica sheet (1) to an aromatic polyamide fibril sheet (2), said integrated mica sheet obtained by forming a mixture of mica flakes and aromatic polyamide fibrils into a sheet and said aromatic polyamide fibril sheet obtained by impregnating an insulating cloth or glass fiber cloth with aromatic polyamide fibrils; (b) treating the integrated sheet material obtained with a thermosetting resin; (c) wrapping an electric conductor with the integrated sheet material; (d) impregnating the wrapped electric conductor with a thermosetting resin under the force of a vacuum or a vacuum-pressure treatment, and (e) molding the resin impregnated wrapped conductor while heating the same.

9 Claims, No Drawings

INSULATED COIL

BACKGROUND OF THE INVENTION

1. Field of the Invention

The present invention relates to a novel insulated coil. More particularly, it relates to an insulated coil for use in high voltage rotary electric machines such as turbine generator and water wheel generator.

2. Description of the Prior Art

Recently, the need has arisen for an insulated coil which exhibits highly stable insulating properties under severe operating conditions such as repeated starting and stopping of heat cycles, the thermal deterioration caused by rising temperatures and the shortcircuiting caused by mechanical vibration.

The conventional insulated coil for high voltage rotary machine has been proposed by coating a conductor with a suitable insulating layer, shaping it into a predetermined shape, winding a mica tape made of a back support, of a fibrous support a nonwoven support or a film support coated with integrated mica or split mica about the conductor impregnating a thermosetting resin such as unsaturated polyester resin or an epoxy resin under vacuum or vacuum-pressure conditions and heat-molding it.

These insulated coils are assembled in a rotary machine and are usually used in a gas environment. Under high voltage, corona discharge is caused by breakdown of the gas such as air in the coil and it may cause breakdown of an insulating layer. In order to prevent the trouble, mica has been used in the coils for high voltage rotary machine. Although excellent insulating materials have been developed, mica has been used as an important insulating material for insulation of a coil because of its excellent heat resistance, corona resistance and voltage breakdown resistance characteristics. Mica is classified into split mica and integrated mica. The mica is bonded on a back support made of a paper, a film, or a porous insulating material such as glass fabric, or a polyester nonwoven fabric with a thermosetting resin to prepare a mica tape or sheet. An integrated mica tape insulating layer and a split mica tape insulating layer are each prepared by impregnating a mica tape or sheet in vacuum or vacuum-pressure impregnating with a thermosetting resin and curing the resin and are tested in comparison. The split mica tape insulating layer has a higher mechanical strength, for example, a higher bending strength of about 120 to 150%, but has lower electric property, for example, lower breakdown voltage as about 75–90% in comparison with those of the integrated mica tape insulating layer. Each mica tape insulating layer has advantages and disadvantages and accordingly, it is not suitable to use only one type.

The integrated mica layer of the conventional integrated mica tape is prepared by forming mica flakes into sheets and consequently the density of the mica flakes is low. In practice, slippage occurs between mica flakes during the taping operation of the integrated mica tape thus resulting in deterioration of the high breakdown voltage of the integrated mica.

The strength of the mica tape is depending upon the back support. Paper, a polyester nonwoven fabric and a film are relatively economical, but have relatively low tensile strength whereas a glass cloth has high tensile strength, but is expensive. Thus, a desired back support has not been found.

SUMMARY OF THE INVENTION

It is an object of the present invention to provide an insulated coil having excellent electric characteristics such as breakdown voltage and mechanical characteristics such as bending strength and excellent thermal characteristics.

The foregoing and other objects of the present invention have been attained by providing an insulated coil which is formed by heat bonding an integral mica sheet (1) to an aromatic polyamide fibril sheet (2), said integrated mica sheet obtained by forming a mixture of mica flakes and aromatic polyamide fibrils into a sheet and said aromatic polyamide fibril sheet obtained by impregnating an insulating cloth or glass fiber cloth with aromatic polyamide fibrils;

(b) treating the integrated sheet material obtained with a thermosetting resin;

(c) wrapping an electric conductor with the integrated sheet material;

(d) impregnating the wrapped electric conductor with a thermosetting resin under the force of a vacuum or a vacuum-pressure treatment, and (e) molding the resin impregnated wrapped conductor while heating the same.

DETAILED DESCRIPTION OF THE PREFERRED EMBODIMENTS

If necessary, the complex integrated mica bonded sheet as the basic substrate of the present invention can be combined with a split mica tape obtained by supporting split mica on a backing support such as a porous insulating glass fiber cloth or polyester nonwoven fabric or a film and impregnating the winding with a thermosetting resin to form a desired insulating layer. The thermosetting resin is impregnated under vacuum or vacuum-pressure conditions. The insulated coil is formed by heat molding the resin impregnated object.

The complex integrated mica bonded sheet as the basic substrate of the present invention will be further illustrated.

An integrated mica sheet can be obtained by casting and an aqueous suspension containing aromatic polyamide fibrils (0.1–5 wt.part) and mica flakes such as amber mica or white mica (100 wt.part). into a sheet and then drying the same. On the other hand, the aromatic polyamide fibril sheet can be obtained by casting an aqueous suspension of aromatic polyamide fibrils on a course insulating cloth such as a glass fiber cloth which the aromatic polyamide fibrils can impregnate into a sheet and then drying the same. If necessary, the aromatic polyamide fibril sheet can be treated by a hot calender roll.

The complex integrated mica bonded sheet is prepared by superposing the integrated mica sheet and the aromatic polyamide sheet and melt-bonding them at 180°–350° C. for about 0.5–10 min. and treating the product with a thermosetting resin such as an epoxy, unsaturated polyester, an esterimide, a silicone and a polyamide at a ratio of 0.1 to 20 wt.parts preferably 5 to 10 wt.part based on 100 wt.parts of the complex integrated mica bonded sheet. The product is cut in a desired width and a length to obtain an insulating tape. When a content of the thermosetting resin is smaller than said limit an adhesiveness between the conductor and the insulating layer is not high enough whereas when a content is larger than the limit, a size of the resulting insulated coil is too large.

In the complex integrated mica bonded sheet used in the present invention, the mica flakes themselves or the mica flakes and the insulating fiber cloth such as the glass fiber cloth are firmly melt-bonded by the aromatic polyamide. Thus, a thickness of the integrated mica layer is comparatively uniform in comparison to the thickness of a mica sheet obtained by preparing sheets of mica flakes. Moreover, in the present product the density between the mica flakes is remarkably high and a strength of the insulating cloth as the support for the aromatic polyamide fibril sheet is high. Still further, the tensile strength of the tape is very high and the insulating characteristics, especially the breakdown voltage, are greater by 110–135%.

With regard to the mechanical properties of the insulating layer of a conventional integrated mica tape made of mica flakes and a backing support, when the tape is treated with a thermosetting resin, the resin impregnates into the gaps of the mica and the back support whereby the mica layer has high elasticity and the back support layer has an elasticity similar to that of the resin. The back support part is usually too hard and brittle and is the weak point of the insulating layer. On the other hand, in the complex integrated mica bonded sheet used in the present invention, the mica flakes and the insulating cloth support are bonded through the aromatic polyamide fibrils in one-body, whereby the cured insulating layer is further firmly bonded in one-body to form the insulating layer having no weak point.

Moreover, the softness of the aromatic polyamide fibril sheet obtained by forming the fibrils into a sheet on the insulating cloth as the support also contributes to give a total insulating layer having balanced hardness and resilience. Moreover, the heat resistance of the insulating layer is improved by high heat resistance of the aromatic polyamide fibril sheet. As the total characteristics, excellent insulating layer is provided.

The complex integrated mica bonded sheet can be used by itself and also can be used with other backing supports including porous insulating supports such as paper, glass fiber cloth and polyester nonwoven fabrics or films. It is also effective to overlap an insulating layer of a laminated mica including no split mica or aromatic polyamide fibrils.

In view of the severe operating conditions of electro-magnetization, vibration, and heat-cycling caused by repeated starting and stopping as encountered in rotary machines, it is also possible to wind the complex integrated mica bonded sheet together with a split mica tape.

The insulated coil of the present invention will be illustrated by certain examples and references which are provided for purposes of illustration only and are not intended to be limiting the invention.

EXAMPLES 1 AND 2

A coil conductor made of double twenty trains of double glass covered rectangular copper wires having a size of 2.2 mm × 5.0 mm × 2000 mm wound (a size of the sectional view of 44 mm × 10 mm). The conductor was wound with each mica tape shown in Table 1 by a half-lap taping and was further wound by a polyester tape (Tetron: Teijin) having a thickness of 0.13 mm as a protective tape for the insulating layer. An epoxy resin composition containing 100 wt.parts of an epoxy resin (Epikote 828: Shell Co.) 100 wt.parts of methyl tetrahydrophthalic anhydride 20 wt.parts of cresylglycidyl ether was impregnated into the assembly in vacuum of 0.1 mmHg for 3 hours and then under high pressure of 3 kg/cm² for 3 hours and the product was heated in an oven at 150° C. for 18 hours to cure the resin thereby producing an insulated coil having 3.0 mm of a thickness of an insulating layer. The characteristics of the resulting insulated coil are shown in Table 2.

In Table 2, Δ tan δ represents a difference between dielectric loss tangent at 5 kV/mm and dielectric loss tangent at 0.5 kV/mm; and the breakdown voltage is calculated by dividing a value given by a 5 kV/min. step by step rising method in silicone oil by a thickness of the insulating layer of 3 mm; and the condition for the bending deformation is to bend 100 times by one side holded beam method for a deformation of 10 mm.

REFERENCE 1

As the conventional process, a coil conductor having the same structure set forth in Example was used a integrated mica tape having a thickness of 0.135 mm and a width of 30 mm was prepared by superposing a integrated mica sheet having a thickness of 0.1 mm and a polyester nonwoven fabric KH 30025K having a thickness of 0.03 mm and impregnating the epoxy resin composition at the same content. The conductor was wound by half-lap taping for 10 times and wound by the protective tape of Example 1 for 1 time and they were treated by the process set forth in Example 1, to obtain an insulated coil having 3.0 mm of a thickness of the insulating layer. The characteristics of the resulting coil are shown in Table 2.

TABLE 1

| Example | Mica Tape | Kind of winding and times | Resin used for immerse | Content of resin (wt. %) |
|---|---|---|---|---|
| 1 | Complex integrated mica tape obtained by melt-bonding a integrated mica sheet*(1) and aromatic polyamide fibril sheet*(2) (Thickness of 0.15 mm) (Width of 30 mm) | Half-lap tape 9 times | Epoxy resin Epikote 1001 (80 part) Zn-octylate (8 part) | 7 |
| 2 | Tape obtained by alternately winding (a) complex integrated mica tape and (b) splitted mica tape (complex integrated mica tape is further wound at first and at least.) | Alternate wind (a) tape 5 times (b) tape 4 times | Epoxy resin Epikote 1001 (80 part) Zn-octylate (8 part) | 7 |

Note:
*(1)Complex integrated mica sheet: Flaky mica with 5% aromatic polyamide fibrils.
*(2)Aromatic polyamide fibril sheet: Aromatic polyamide fibrils are sheeted on glass fiber cloth and dried and hot-calendered.
(1)Glass fiber cloth: manufactured by Arisawa Seisakusho
(2)Splitted mica tape: T mica manufactured by Kobishi Denki K.K.
(3)Epikote 1001: epoxy resin manufactured by Shell Chem. Co.

TABLE 2

| | Δ tan δ (%) (initial) | Δ tan δ (%) (180° C. 20 day heated) | Breakdown voltage (kV/mm) (initial) | Δ tan δ (%) (After bend deformation) |
|---|---|---|---|---|
| Exp. 1 | 0.02 | 0.08 | 32.5 | 0.09 |
| Exp. 2 | 0.03 | 0.09 | 32.0 | 0.07 |
| Ref. 1 | 0.05 | 0.45 | 28.0 | 1.53 |

In the examples, the epoxy resin was impregnated a curing agent for epoxy resin was added to the components of the mica tape so as to prolong the life of the resin. It is possible to cure independently the impregnated resin and the resin in the mica tape to use it in practice.

The insulated coils prepared by using the other thermosetting resins attain the similar effect.

As described, the insulated coil of the present invention has excellent electric characteristics, mechanical characteristics and thermal characteristics and relatively economical, therefore, the insulated coil of the present invention has excellent industrial value.

I claim:

1. An insulated coil formed by a method, comprising:
   (a) heat bonding an integrated mica sheet (1) to an aromatic polyamide fibril sheet (2), said integrated mica sheet obtained by forming a mixture of mica flakes and aromatic polyamide fibrils into a sheet and said aromatic polyamide fibril sheet obtained by impregnating an insulating cloth or glass fiber cloth with aromatic polyamide fibrils;
   (b) treating the integrated sheet material obtained with a thermosetting resin;
   (c) wrapping an electric conductor with the integrated sheet material;
   (d) impregnating the wrapped electric conductor with a thermosetting resin under the force of a vacuum or a vacuum-pressure treatment; and
   (e) molding the resin impregnated wrapped conductor while heating the same.

2. The insulated coil of claim 1, wherein said aromatic polyamide fibril sheet is obtained by a hot calendering technique.

3. The insulated coil of claim 1, which further comprises a laminated mica structure formed by supporting said complex integrated mica bonded sheet on a backing support of a porous, insulating glass fiber cloth, a nonwoven polyester fabric, a film not provided with split mica or a sheet of aromatic polyamide fibrils.

4. The insulated coil of claim 3, which further comprises a laminated mica structure formed by supporting said complex integrated mica bonded sheet on a backing support of a porous, insulating glass fiber cloth, a nonwoven polyester fabric, a film not provided with split mica or a sheet of aromatic polyamide fibrils.

5. The insulated coil of claim 1, wherein the taped coil is formed by winding said coil with said complex integrated mica bonded sheet and a split mica tape or sheet prepared by supporting split mica on a porous insulating glass fiber cloth, polyester nonwoven fabric or film support and impregnating the support with a thermosetting resin.

6. The insulated coil of claim 2, wherein the taped coil is formed by winding said coil with said complex integrated mica bonded sheet and a split mica tape or sheet prepared by supporting split mica on a porous insulating glass fiber cloth, polyester nonwoven fabric or film support and impregnating the support with a thermosetting resin.

7. The insulated coil of claim 1, wherein the amount of said thermosetting resin combined with 100 parts by weight of said complex integrated mica bonded sheet ranges from 0.1 to 20 parts by weight.

8. The insulated coil of claim 1, wherein said thermosetting resin is an epoxy resin, an unsaturated polyester, an esterimide, a silicone or a polyamide.

9. The insulated coil of claim 1, wherein said integrated mica sheet comprises from 0.1–5 parts by weight of aromatic polyamide fibrils per 100 parts by weight of mica flakes.

* * * * *